2 Sheets—Sheet 1.

W. R. RUSSELL & C. STEENKEN.
COMBINED HOE AND SHOVEL.

No. 194,375. Patented Aug. 21, 1877.

WITNESSES
Nat. E. Oliphant.
T. A. Ourand.

INVENTORS
Walter R. Russell,
Charles Steenken,
per Chas. H. Fowler
Attorney.

2 Sheets—Sheet 2.

W. R. RUSSELL & C. STEENKEN.
COMBINED HOE AND SHOVEL.

No. 194,375. Patented Aug. 21, 1877.

WITNESSES
Nat. E. Oliphant.
T. D. Durand.

INVENTORS
Walter R. Russell.
Charles Steenken.
per Chas. H. Fowler.
Attorney.

UNITED STATES PATENT OFFICE.

WALTER R. RUSSELL AND CHARLES STEENKEN, OF NORFOLK, VIRGINIA.

IMPROVEMENT IN COMBINED HOE AND SHOVEL.

Specification forming part of Letters Patent No. 194,375, dated August 21, 1877; application filed June 4, 1877.

*To all whom it may concern:*

Be it known that we, WALTER R. RUSSELL and CHARLES STEENKEN, of Norfolk, in the county of Norfolk and State of Virginia, have invented a new and valuable Improvement in Combined Hoe and Shovel or Fork and Rake; and we do hereby declare that the following is a full, clear, and exact description of the construction and operation of the same, reference being had to the annexed drawings, making a part of this specification, and to the letters and figures of reference marked thereon.

Figure 1:
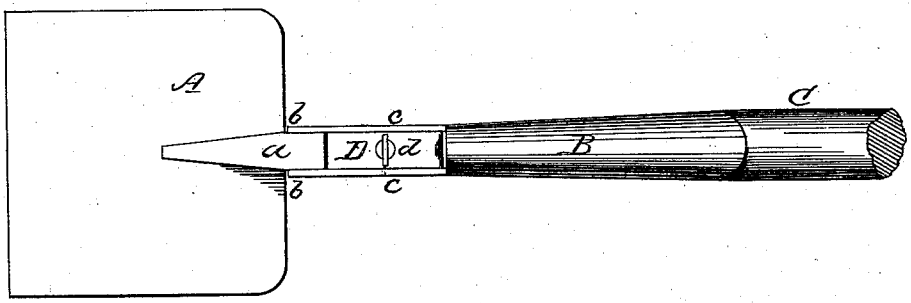
Figure 2:
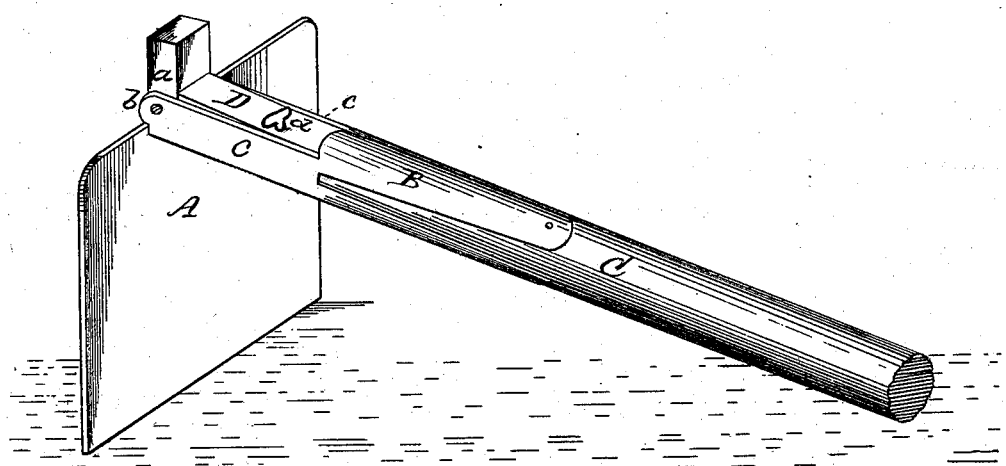
Figure 3:
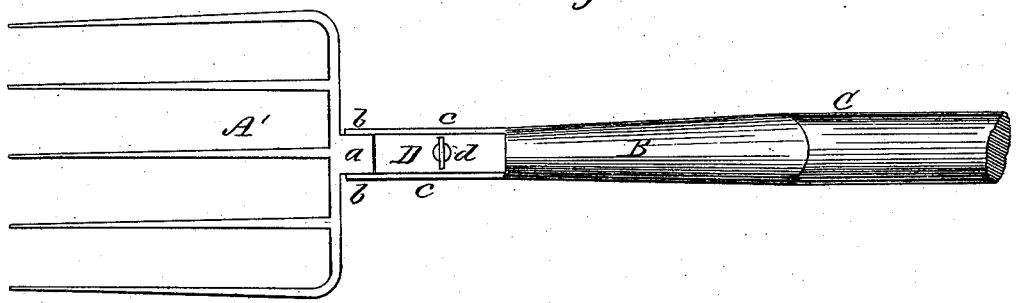
Figure 4:
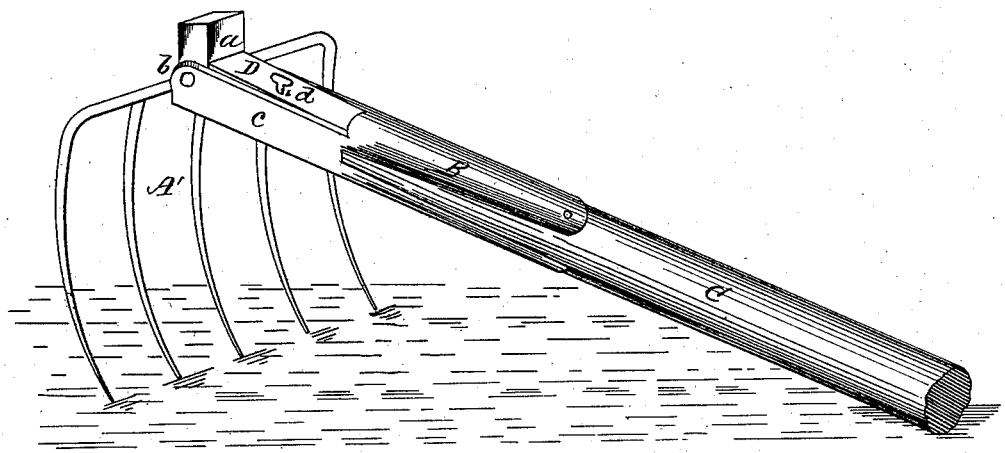

Figures 1 and 2 of the drawing are representations of our invention, showing it applied to a hoe or shovel. Figs. 3 and 4 are similar views, showing it applied to a fork or rake.

This invention has relation to a new and useful improvement in agricultural implements, whereby a shovel may be converted into a hoe, or a fork may be converted into a rake, and at the same time making a strong and durable implement.

The invention consists in a blade or fork having formed upon its upper end a shank, the same being pivoted to the handle, in connection with a hinged clamping-plate held in position against the shank, to act as a stop or brace-plate when the plate or fork is at right angles to the handle, when it is desired to use them as a hoe or rake, said plate being locked in position by a thumb-screw, as will be hereinafter more fully described.

In the accompanying drawings, A represents a blade, and A' a fork, of any suitable metal, formed with a shank, $a$, of any desired length, extending from the top thereof. This shank $a$ is pivoted to ears $b\ b$ upon the end of a metal socket, B, to which the handle C is secured. The socket B at its outer end is formed with side and bottom plates $c$, to which is hinged a flat plate, D, the same being held in position by a thumb-screw, $d$, passing through said plate and the bottom plate of the socket.

When the blade A and fork A' are in position, as shown in Figs. 1 and 3, they may be used as a shovel and as a fork; but when the thumb-screw is withdrawn they are allowed to be brought at right angles to the handle, and are used as a hoe and rake, the plate D acting as a stop, against which the shank $a$ bears, and is held firmly in position by the thumb-screw $d$.

Now, when the position of the implements is to be changed the thumb-screw is loosened and the plate D swung back, which allows the shank to be brought between the side plates $c$, after which the plate D is brought down upon the upper face of the shank, and clamped securely in place by the thumb-screw $d$.

Having now fully described our invention, what we claim as new, and desire to secure by Letters Patent, is—

A blade or fork having the shank $a$ pivoted between the plates $c$ of the socket B, in combination with the hinged plate D, provided with the thumb-screw $d$, substantially as and for the purposes set forth.

In testimony that we claim the above we have hereunto subscribed our names in the presence of two witnesses.

WALTER R. RUSSELL.
CHARLES STEENKEN.

Witnesses:
Jos. D. YOUNG,
L. A. ROSE.